US010259339B1

(12) United States Patent
Miura et al.

(10) Patent No.: US 10,259,339 B1
(45) Date of Patent: Apr. 16, 2019

(54) STRUCTURE OF MOUNTING POWER CONTROL DEVICE IN VEHICLE

(71) Applicant: TOYOTA JIDOSHA KABUSHIKI KAISHA, Toyota-shi, Aichi (JP)

(72) Inventors: Shinichi Miura, Toyota (JP); Naoki Marukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/162,692

(22) Filed: Oct. 17, 2018

(30) Foreign Application Priority Data

Nov. 22, 2017 (JP) ................................. 2017-224749
Aug. 23, 2018 (JP) ................................. 2018-156155

(51) Int. Cl.
*B60L 15/00* (2006.01)
*B60L 11/10* (2006.01)

(52) U.S. Cl.
CPC ............. *B60L 15/007* (2013.01); *B60L 11/10* (2013.01); *B60L 2210/40* (2013.01)

(58) Field of Classification Search
CPC .................................................... B60L 15/007
See application file for complete search history.

(56) References Cited

U.S. PATENT DOCUMENTS

2015/0305177 A1* 10/2015 Nakashima .......... H05K 5/0204
310/68 D
2017/0018939 A1* 1/2017 Shiba .................... H02J 7/0029

FOREIGN PATENT DOCUMENTS

| JP | 2005-032830 A | 2/2005 |
| JP | 2015-205597 A | 11/2015 |
| JP | 2017-019460 A | 1/2017 |

* cited by examiner

*Primary Examiner* — James A Shriver, II
*Assistant Examiner* — James J Triggs
(74) *Attorney, Agent, or Firm* — Oliff PLC (57) ABSTRACT

A structure of mounting a power control device in a vehicle includes a housing that houses an electric motor for running, a power control device fixed above the housing with a gap between the power control device and the housing, and a cable connection portion provided on an upper surface of the housing at a position facing the power control device. A head of a bolt may be exposed on a lower portion of a casing of the power control device at a position facing the cable connection portion and a rib may be provided on the lower portion of the casing next to the head of the bolt, the rib protruding lower than the head of the bolt.

8 Claims, 10 Drawing Sheets

STRUCTURE OF MOUNTING POWER CONTROL DEVICE IN VEHICLE

CROSS-REFERENCE TO RELATED APPLICATION

This application claims priority to Japanese Patent Application No. 2017-224749 filed on Nov. 22, 2017 and Japanese Patent Application No. 2018-156155 filed on Aug. 23, 2018, the contents of which are hereby incorporated by reference into the present application.

TECHNICAL FIELD

The technique disclosed herein relates to a structure of mounting a power control device for controlling electric power supplied to an electric traction motor.

BACKGROUND

An electric vehicle is equipped with a power control device that controls electric power supplied to an electric traction motor. For example, Japanese Patent Application Publication No. 2017-019460 describes an electric vehicle in which a power control device is fixed on a housing that houses an electric traction motor. The power control device described in this document is supported above the housing with a gap therebetween via a bracket. The term "electric vehicle" as used herein includes a hybrid vehicle that is provided with both the electric traction motor and an engine, and a vehicle in which the electric traction motor is driven with a fuel cell.

Bolts are attached at various positions of a casing of the power control device mounted on the electric vehicle. In the power control devices described in Japanese Patent Application Publication No. 2015-205597 and Japanese Patent Application Publication No. 2005-032830, heads of the bolts are exposed on a lower surface of the casing.

SUMMARY

In a structure that includes the power control device supported above the housing via the bracket, the bracket may be deformed upon impact of collision, causing the power control device 10 move downward and to be brought into contact with the housing in some cases. When a cable connection portion is provided on an upper surface of the housing at a position facing the power control device, the head of the bolt exposed on a lower portion of the power control device may interfere with the cable connection portion, thereby damaging the cable connection portion. Accordingly, it is an object of the present disclosure herein to provide a technique which prevents a head of a bolt exposed on a lower surface of a power control device from interfering with a cable connection portion of a housing upon collision.

A structure of mounting a power control device in a vehicle is disclosed herein. The structure may comprise a housing that houses an electric traction motor, a power control device fixed above the housing with a gap between the power control device and the housing, and a cable connection portion provided on an upper surface of the housing at a position facing the power control device. A head of a bolt may be exposed on a lower portion of a casing of the power control device at a position facing the cable connection portion, and a rib may be provided on the lower portion of the casing next to the head of the bolt, the rib protruding lower than the head of the bolt. When the power control device moves downward due to the impact of collision, the rib comes into contact with the cable connection portion, thereby avoiding the contact of the head of the bolt with the cable connection portion.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved a structure of mounting a power control device in a vehicle.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

Figure 1:
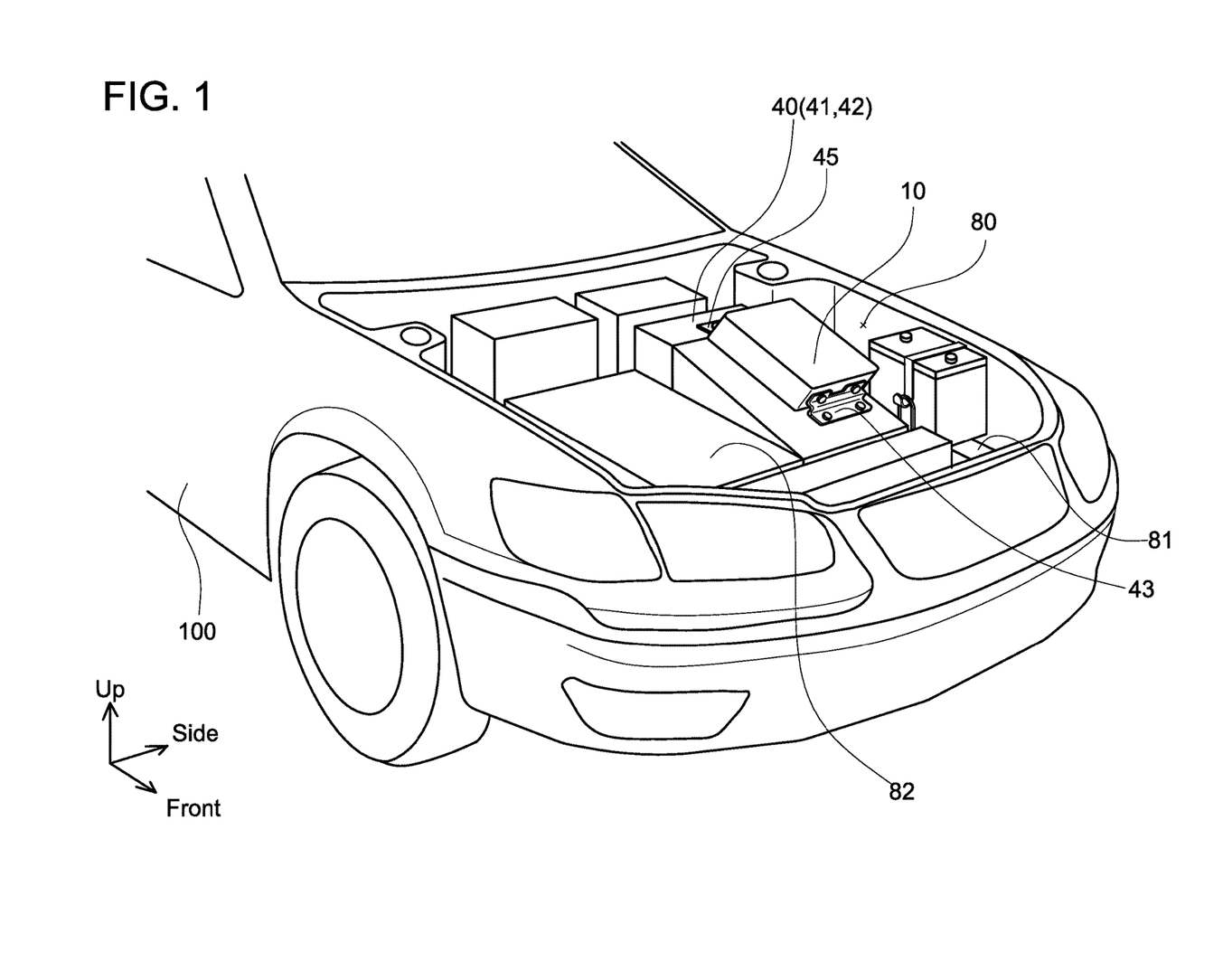
FIG. 1 is a perspective view of a front compartment with a power control device mounted therein.

A structure of mounting a power control device in a vehicle according to an embodiment will be described below with reference to accompanying drawings. The structure of mounting the power control device in a vehicle according to an embodiment is applied to a hybrid vehicle 100. FIG. 1 is a perspective view of a front compartment 80 of the hybrid vehicle 100. Referring to FIG. 1, a device layout in the front compartment 80 will be described. A Front axis in the coordinate system in the drawing indicates a frontward direction of the vehicle. An Up axis in the coordinate system indicates an upward direction of the vehicle. A Side axis indicates a vehicle width direction (i.e., a leftward direction of the vehicle). The meanings of the Front axis, the Up axis, and the Side axis are same as those in other drawings.

The hybrid vehicle 100 includes an engine 82 and an electric traction motor 41 (hereinafter simply referred to as "motor") as drive sources. The motor 41 is housed in a motor housing 40 together with a gear set 42. The motor housing 40 and the engine 82 are connected to each other in the vehicle width direction and are bridged over two side members 81. Note that in FIG. 1, one of the side members is hidden and cannot be shown.

A power control device 10 is fixed above the motor housing 40 by brackets 43 and 45. The power control device 10 controls driving power of the motor 41. Specifically, the power control device 10 converts DC power of a power source into driving power (AC power) of the motor 41. To shorten a transmission distance of the driving power, the power control device 10 is disposed above the motor housing 40

Figure 2:
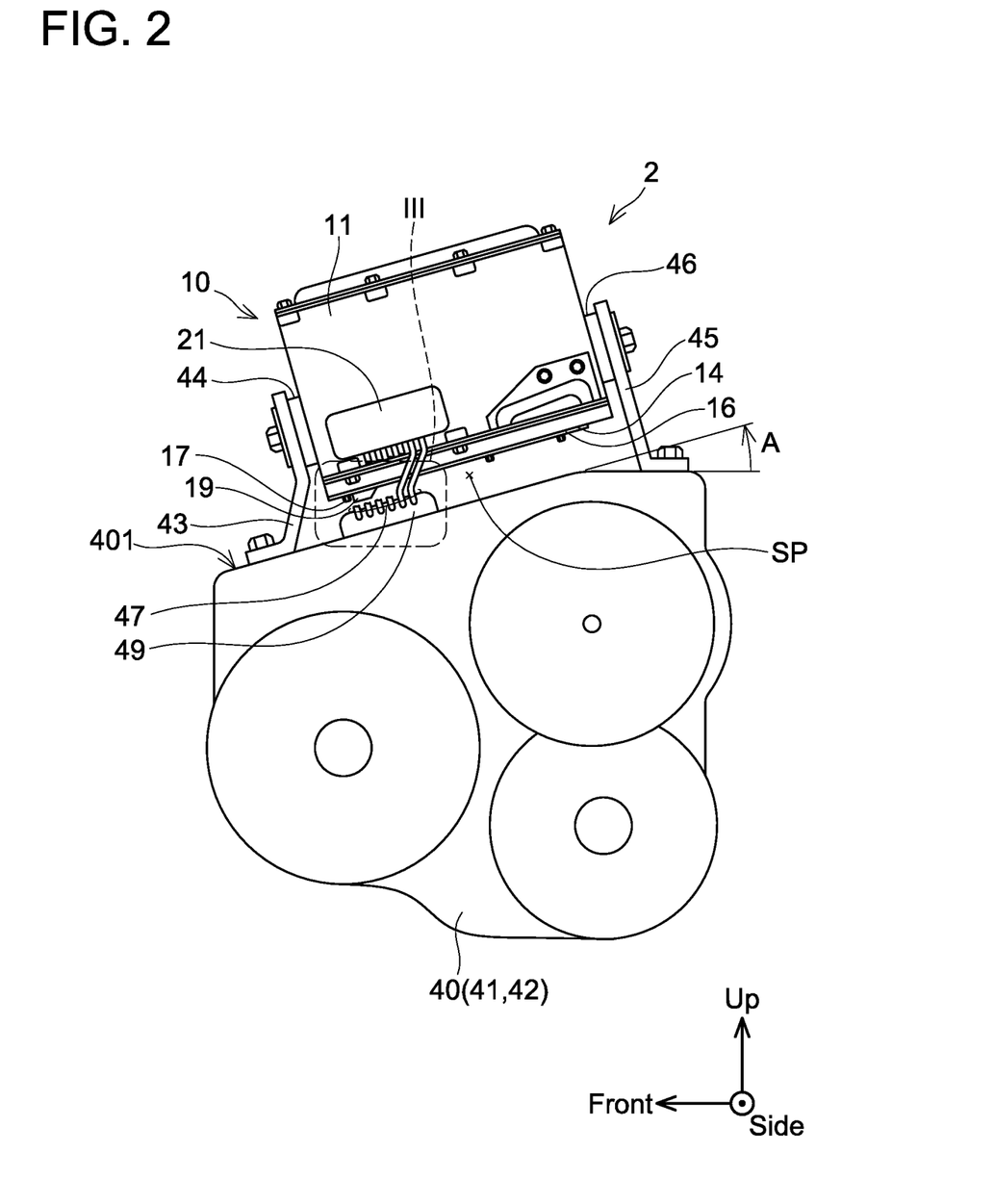
FIG. 2 is a side view of the power control device fixed above a motor housing.

FIG. 2 is a side view of the power control device 10 fixed above the motor housing 40. FIG. 2 shows one characteristic of a vehicle-mounted structure 2 of the power control device 10. The power control device 10 is fixed above the motor housing 40 by the front bracket 43 and the rear bracket 45 with a gap Sp between the motor housing 40 and the power control device 10. An antivibration bush 44 is interposed between a casing 11 of the power control device 10 and the front bracket 43, and an antivibration bush 46 is interposed between the casing 11 and the rear bracket 45. The power control device 10 is not in direct contact with the motor housing 40, and is fixed above the motor housing 40 via the brackets 43 and 45 and the antivibration bushes 44 and 46. The brackets 43 and 45 and the antivibration bushes 44 and 46 reduce vibrations received by the casing 11 of the power control device 10 from the motor housing 40.

An upper surface 401 of the motor housing 40 is inclined forward and downward at an angle A. The casing 11 of the power control device 10 is supported by the motor housing 40 while also being in a posture inclined forward and downward. The angle A is in a range from approximately 10 to 30 degrees. When the vehicle collides, since the casing 11 is inclined forward and downward, the brackets 43 and 45 may be deformed, causing the casing 11 to move downward, and consequently the casing 11 may come into contact with the upper surface 401 of the motor housing 40 in some cases.

A connector 21 for six power cables 47 is provided on a lateral surface of the casing 11. Each of the power cables 47 transmits driving power of the motor 41. Meanwhile, a connection portion (cable connection portion 49) for the power cables 47 is provided on the upper surface 401 of the motor housing 40. The motor housing 40 houses two three-phase AC motors, and the power control device 10 supplies two sets of three-phase AC currents to the motors. Thus, the power control device 10 and the motor housing 40 are connected by the six power cables 47. In FIG. 2, only two of the six power cables 47 positioned on the right side are illustrated, whereas illustration of intermediate parts of the remaining four cables is omitted.

The cable connection portion 49 protrudes upward from the upper surface 401 of the motor housing 40. The cable connection portion 49 is provided at a position facing a lower surface of the casing 11 in the power control device 10. When the casing 11 moves downward due to the impact of collision, a lower portion of the casing 11 comes into contact with the cable connection portion 49.

A cover 16 is fixed to a lower portion of the casing 11 by a plurality of bolts 17. The cover 16 is a member that closes a coolant flow channel provided on the lower portion of the casing 11. The cover 16 is fixed to the lower surface of the casing 11 with the gasket 14 interposed therebetween. The coolant flow channel, the cover 16 and the gasket 14 will be described later.

Bolt heads of the bolts 17 are exposed on a lower portion (lower surface) of the casing 11. Some of the bolt heads of the bolts 17 are located directly above the cable connection portion 49 of the motor housing 40. When the casing 11 moves downward due to the impact of collision, the bolt head of the bolt 17 may possibly come into contact with the cable connection portion 49.

Since the bolt head of each bolt has an angular shape, the cable connection portion 49 might be damaged if any bolt head comes into contact with the cable connection portion 49. Since the power cables 47 connected to the cable connection portion 49 transmit high power for driving the electric traction motor, it is not desirable that any damage is caused to the cable connecting portion 49 upon collision. In order to protect the cable connection portion 49, ribs 19 are provided next to the bolt heads of the respective bolts exposed on the lower surface of the casing 11.

Figure 3:
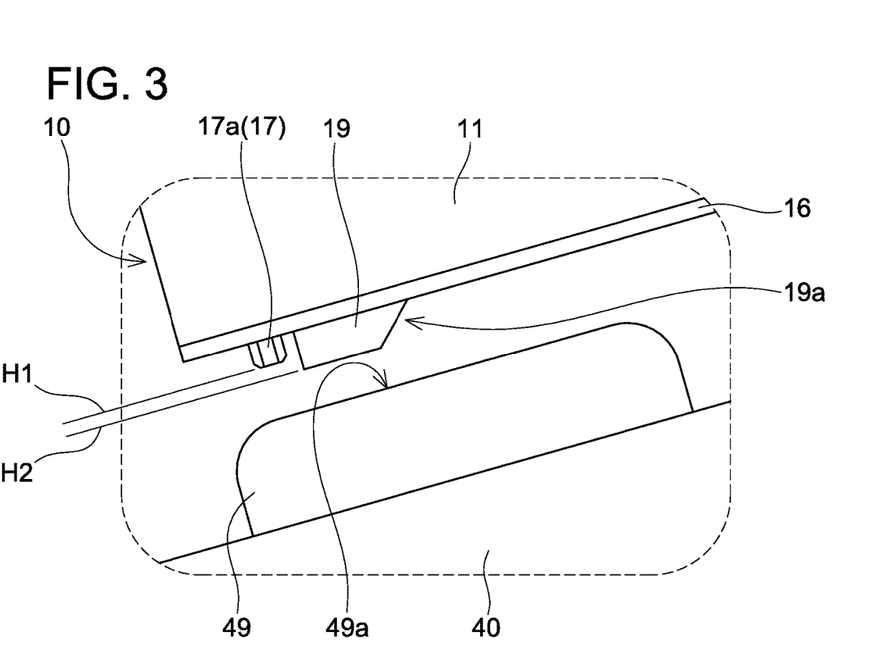
FIG. 3 is an enlarged view of an area indicated by reference character III in FIG. 2.
Figure 4:
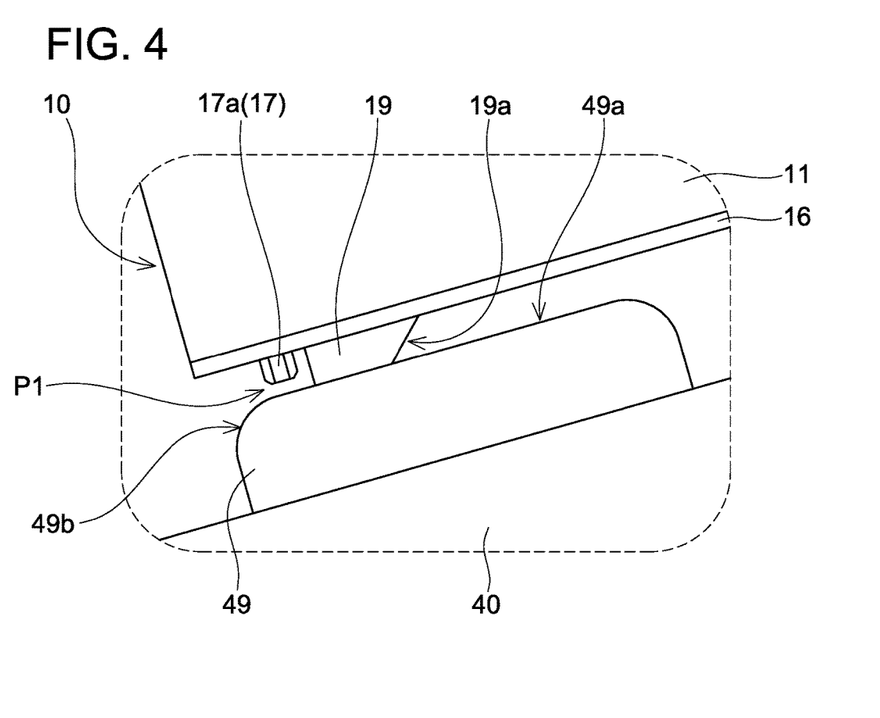
FIG. 4 is a diagram showing a state in which the power control device moves downward.

FIG. 3 is an enlarged view of an area indicated by reference character III in FIG. 2. FIG. 4 shows a state in which the casing 11 of the power control device 10 moves downward, causing the casing 11 and the cable connection portion 49 to be in contact with each other. As mentioned above, each of the ribs 19 is provided next to a bolt head 17a exposed on the lower surface of the casing 11. Each rib 19 is provided at a position facing an upper surface 49a of the cable connection portion 49 in the motor housing 40. A lower end H2 of the rib 19 protrudes lower than a lower end H1 of the bolt head 17a. Thus, as shown in FIG. 4, when the casing 11 moves downward, the ribs 19 come into contact with the cable connection portion 49, and thereby the contact of the bolt heads 17a with the cable connection portion 49 is avoided. As indicated by an arrow P1 in FIG. 4, when the rib 19 comes into contact with the cable connection portion 49, a gap is secured between the cable connection portion 49 and each bolt head 17a.

A part of a lower surface of the rib 19 (inclined surface 19a) is inclined relative to the upper surface 49a of the cable connection portion 49. The inclined surface 19a makes the rib 19 smoothly slide down a front upper corner 49b of the cable connection portion 49 when the casing 11 moves forward while contacting the cable connection portion 49. The inclined surface 19a prevents the moving rib 19 from damaging the cable connection portion 49. The remaining area of the lower surface of the rib 19 is flat, so that when the rib 19 and the cable connection portion 49 are in contact with each other, the lower surface of the rib 19 comes into surface contact with the upper surface 49a of the cable connection portion 49, and thereby a concentrated load is prevented from being applied onto the cable connection portion 49.

Figure 5:
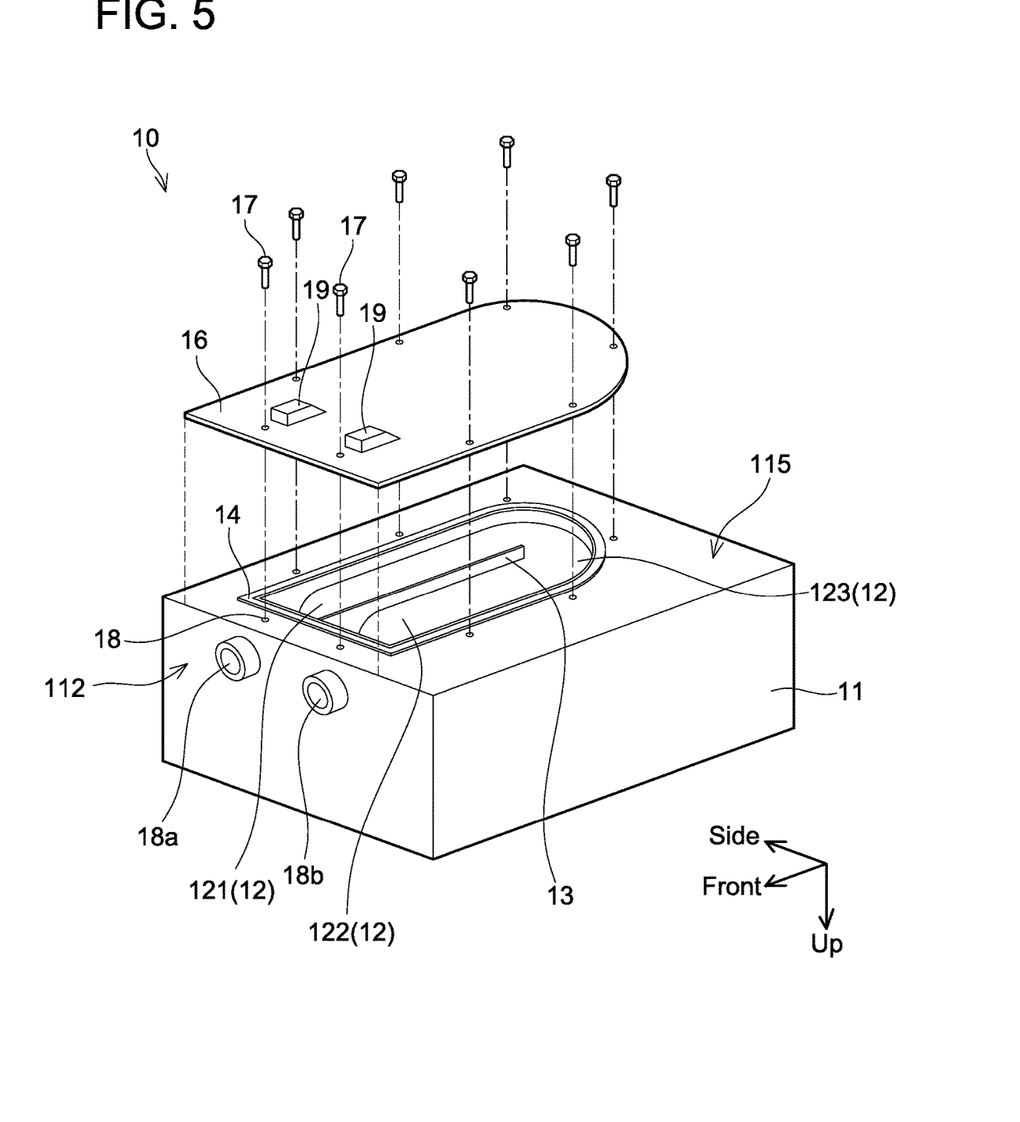
FIG. 5 is a perspective view of the power control device as viewed obliquely from below.

FIG. 5 is a perspective view of the power control device 10 as viewed obliquely from below. FIG. 5 is the view of the power control device from which the cover 16 is removed.

The Front/Up/Side in the coordinate system in the drawing means the Frontward/Upward/Side directions of the hybrid vehicle 100 when the power control device 10 is mounted on the hybrid vehicle 100. Note that the downward direction in FIG. 5 is the Up direction.

The casing 11 of the power control device 10 includes, on its lower portion, a flow channel (coolant flow channel 12) through which coolant flows. The coolant flow channel 12 is divided into two parts, namely, a supply passage 121 and a discharge passage 122 in a lateral direction (Side direction) by a partition plate 13. The supply passage 121 communicates with a supply port 18a provided in a front surface 112 of the casing 11, whereas the discharge passage 122 communicates with a discharge port 18b provided in the front surface 112 of the casing 11. The partition plate 13 extends from the front to the back and ends halfway. The supply passage 121 and the discharge passage 122 are connected together by a U-turn portion 123 at a back portion of the coolant flow channel 12. A coolant circulation device (not shown) is connected to the supply port 18a and the discharge port 18b, so that the coolant is supplied from the supply port 18a. The coolant supplied from the supply port 18a passes through the supply passage 121, the U-turn portion 123, and the discharge passage 122 and is then discharged from the discharge port 18b. The coolant may be a liquid, such as water or a Long Life Coolant (LLC). Inside the casing 11, an electric component that potentially generates a large amount of heat is disposed to face the coolant flow channel 12. The heat generated from the electric component is absorbed in the coolant that passes through the coolant flow channel 12.

The coolant flow channel 12 provided in the lower portion of the casing 11 has a lower side (a bottom of the coolant flow channel 12) opened. A gasket 14 is disposed on a lower surface 115 of the casing 11 so as to surround the coolant flow channel 12. The opened bottom surface of the coolant flow channel 12 is covered by the cover 16. The cover 16 is attached to the lower surface 115 of the casing 11 with the gasket 14 interposed between the cover 16 and the lower surface 115. The cover 16 is attached to the lower surface 115 by the plurality of bolts 17. A plurality of bolt holes 18 into which the bolts 17 are screwed is provided in the lower surface 115 of the casing 11 so as to surround the gasket 14.

The gasket 14 may be a metal gasket or a rubber gasket. Alternatively, the gasket 14 may be a Formed In Place Gasket (FIPG).

The two ribs 19 are provided on the cover 16. Each of the ribs 19 is provided next to a corresponding one of two bolts for fixing a front portion of the cover 16 among the plurality of bolts 17 fixing the cover 16.

Figure 6:
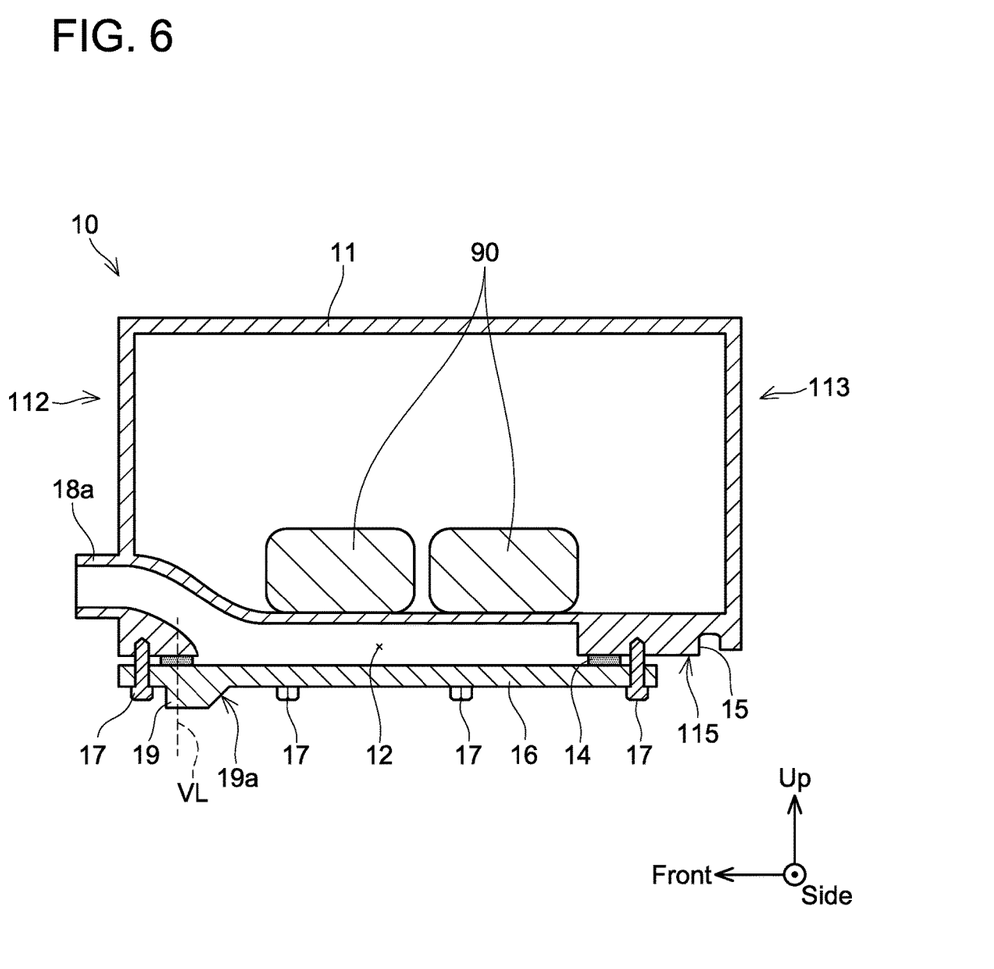
FIG. 6 is a cross-sectional view of the power control device.

FIG. 6 is a cross-sectional view of the casing 11 taken along a plane including the Front axis and the Up axis therein. FIG. 6 is a cross-sectional view taken along a plane passing through the supply port 18a. As mentioned above, within the casing 11, electric components 90 are disposed to face the coolant flow channel 12. The electric components 90 are, for example, a reactor and a capacitor.

The ribs 19 are provided on the cover 16. Each of the ribs 19 is provided next to and behind a corresponding bolt 17 located at a forefront among the plurality of bolts 17 fixing the cover 16. The ribs 19 are located directly below the gasket 14. The gasket 14 and each rib 19 are arranged to overlap each other as viewed from a direction normal to the lower surface 115 (along a direction indicated by a dashed line VL in the drawing). The ribs 19 contribute to improvement of a strength of the cover 16 that presses the gasket 14. The ribs 19 reinforce the cover directly below the gasket 14, so that the ribs 19 also contribute improvement of a sealing property of the coolant flow channel 12 by the gasket 14.

(First Variant)

Figure 7:
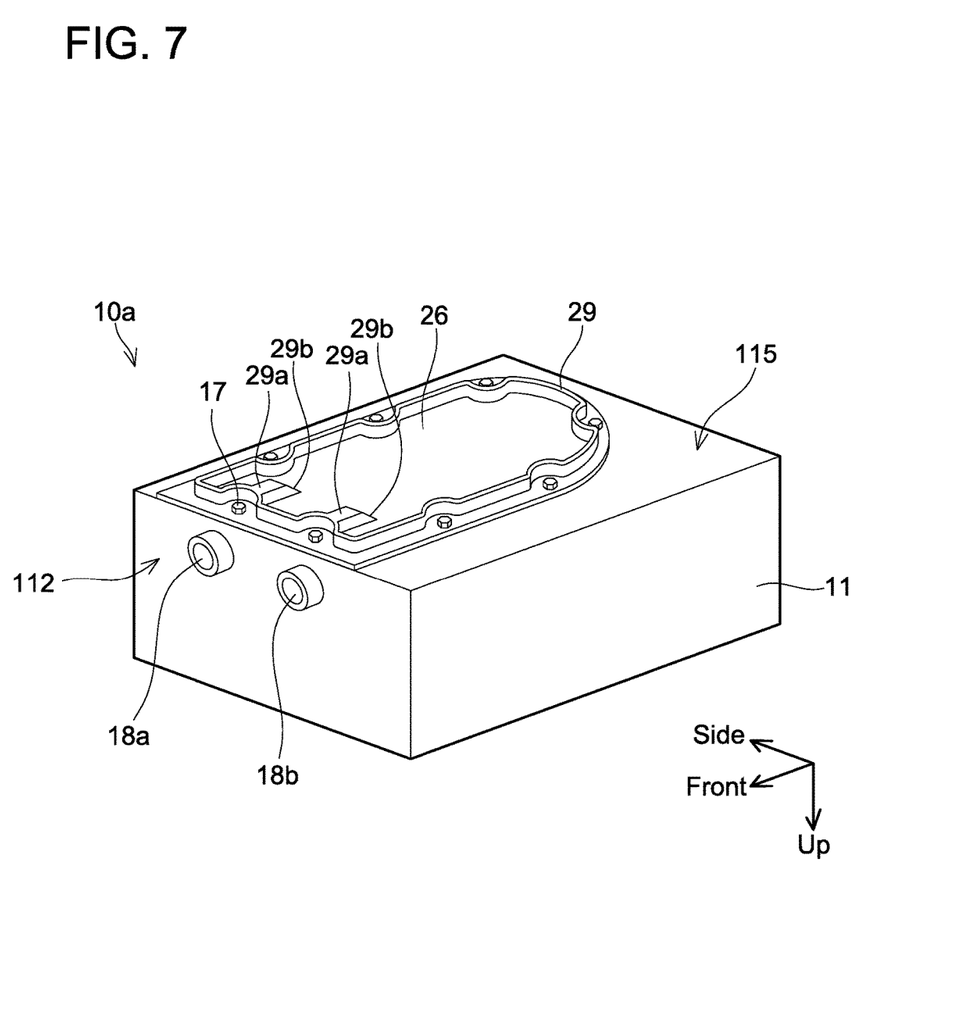
FIG. 7 is a perspective view of a power control device according to a first variant as viewed obliquely from below.

FIG. 7 shows a power control device 10a according to a first variant. FIG. 7 is a perspective view of the power control device 10a as viewed obliquely from below. FIG. 7 corresponds to FIG. 5. Here, the coolant flow channel 12 provided in the lower surface 115 of the casing 11 (see FIG. 5) is closed by a cover 26. The cover 26 is fixed to the lower surface 115 of the casing 11 by the plurality of bolts 17. The cover 26 is provided with a rib 29 that is formed annularly along an edge of the cover 26. The rib 29 extends to pass by each of the plurality of bolts 17. Like the ribs 19 of the power control device 10 described above, the rib 29 protrudes lower than the bolt head. Similar to the power control device 10 described above, when the power control device 10a is fixed above the motor housing 40, the bolts 17 located at the front end of the power control device 10a are positioned above the cable connection portion 49. The rib 29 has rib reinforcing portions 29a provided behind bolts 17 that are located at the front end of the power control device 10a. Each of the rib reinforcing portions 29a extends backward from a corresponding portion of the rib 29. The rib reinforcing portion 29a has a same height as other portions of the rib 29, but has an inclined surface 29b at its back portion. The rib 29 is provided so as to overlap with the ring-shaped gasket (see FIG. 5) interposed between the lower surface 115 of the casing 11 and the cover 26 as viewed from a direction normal to the cover 26. The rib 29 of the power control device 10a also exhibits same effects as those in the power control device 10 of the embodiment.

(Second Variant)

Figure 8:
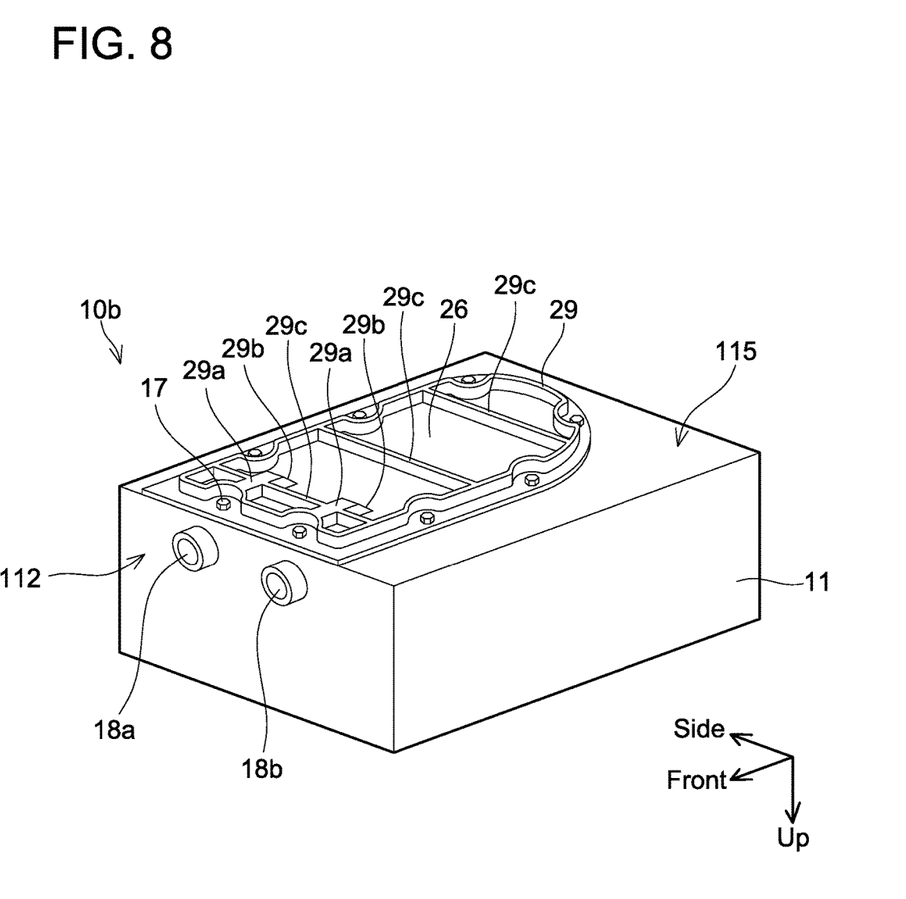
FIG. 8 is a perspective view of a power control device according to a second variant as viewed obliquely from below.

FIG. 8 shows a power control device 10b according to a second variant. FIG. 8 is a perspective view of the power control device 10b as viewed obliquely from below. In FIG. 8, the coolant flow channel 12 is closed by the cover 26 (see FIG. 5) as in FIG. 7. The cover 26 of the present variant is identical to the cover 26 of the first variant except that a configuration of the rib 29 is different from that in the first variant. The cover 26 includes three molten metal flow ribs 29c in addition to two rib reinforcing portions 29a. The cover 26 is molded in a die cast. The cast for molding the cover 26 is provided with molten metal flow grooves for efficiently flowing molten metal through an entirety of the cast. The respective molten metal flow ribs 29c are molded by solidifying the molten metal in the molten metal flow grooves.

The respective molten metal flow ribs 29c extend in a traverse direction (Side direction). The respective rib reinforcing portions 29a extend in a front-rear direction (Front direction). Further, the two rib reinforcing portions 29a are perpendicular to a molten metal flow rib 29c that is located foremost among the three molten metal flow ribs 29c. The grooves which serve as bases of the molten metal flow ribs 29c smooth flow of the molten metal when the two rib reinforcing portions 29a (e.g., a plurality of ribs) are molded. It should be noted that the rib reinforcing portions 29a do not need to be strictly perpendicular to the molten metal flow rib 29c. For example, an angle formed by the rib reinforcing portions 29a and the molten metal flow ribs 29 may be equal to or smaller than 90 degrees. Generally speaking, the rib reinforcing portions 29a only have to intersect the molten metal flow rib 29c. Further, a number of the rib reinforcing portions 29a is not limited to two, and three or more of the rib reinforcing portions 29a may be provided.

Further, a strength of the rib reinforcing portions 29a is improved by the rib reinforcing portions 29a intersecting the molten metal flow ribs 29c. As aforementioned, the rib reinforcing portions 29a are provided for the purpose of being brought into contact with the cable connection portion 49 upon collision of the vehicle and sliding the casing 11 down forward. By improving the strength of the rib reinforcing portions 29a, distortion of the rib reinforcing portions 29a upon contact with the cable connection portion 49 is prevented, and the aforementioned purpose is thereby achieved appropriately.

(Third Variant)

Figure 9:
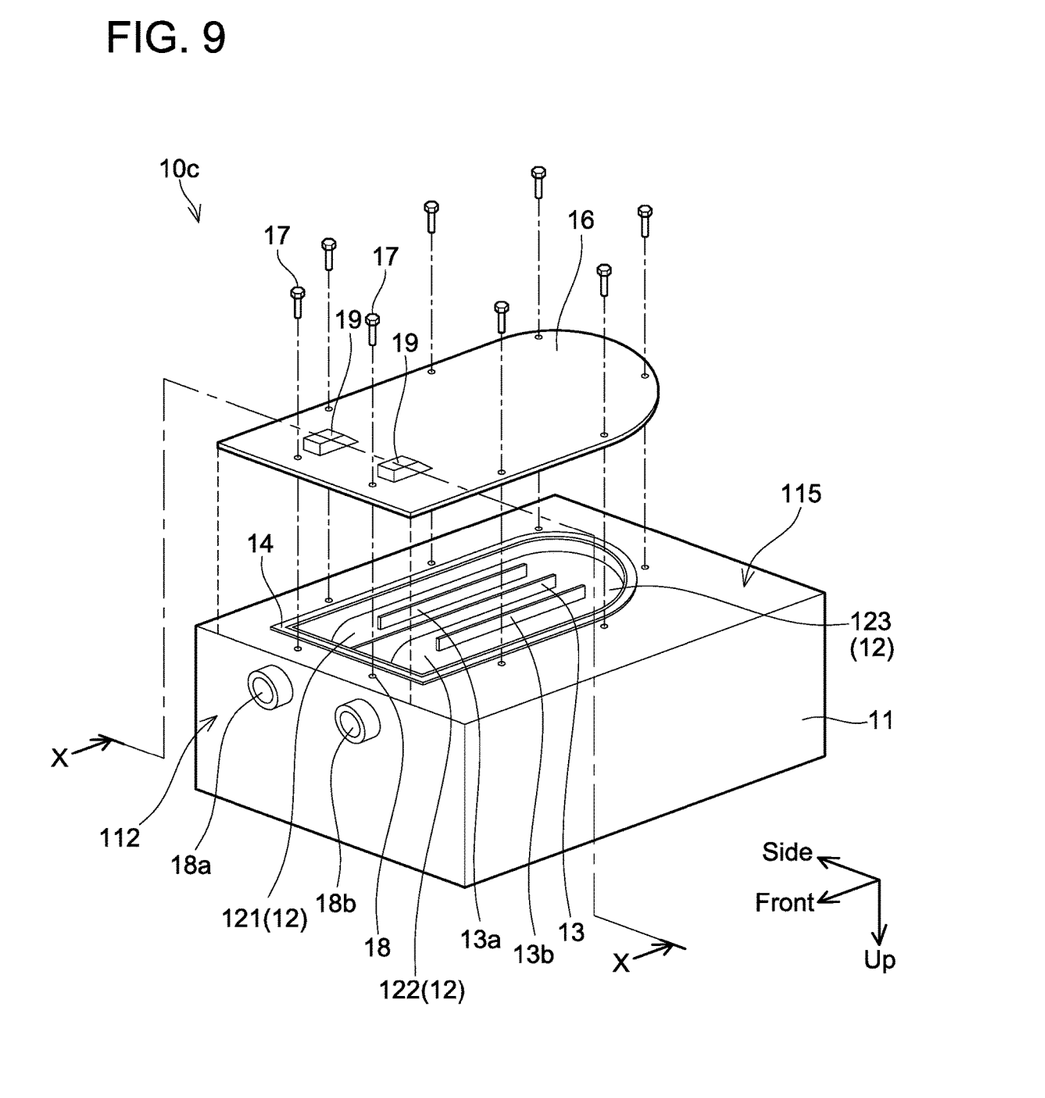
FIG. 9 is a perspective view of a power control device according to a third variant as viewed obliquely from below.
Figure 10:
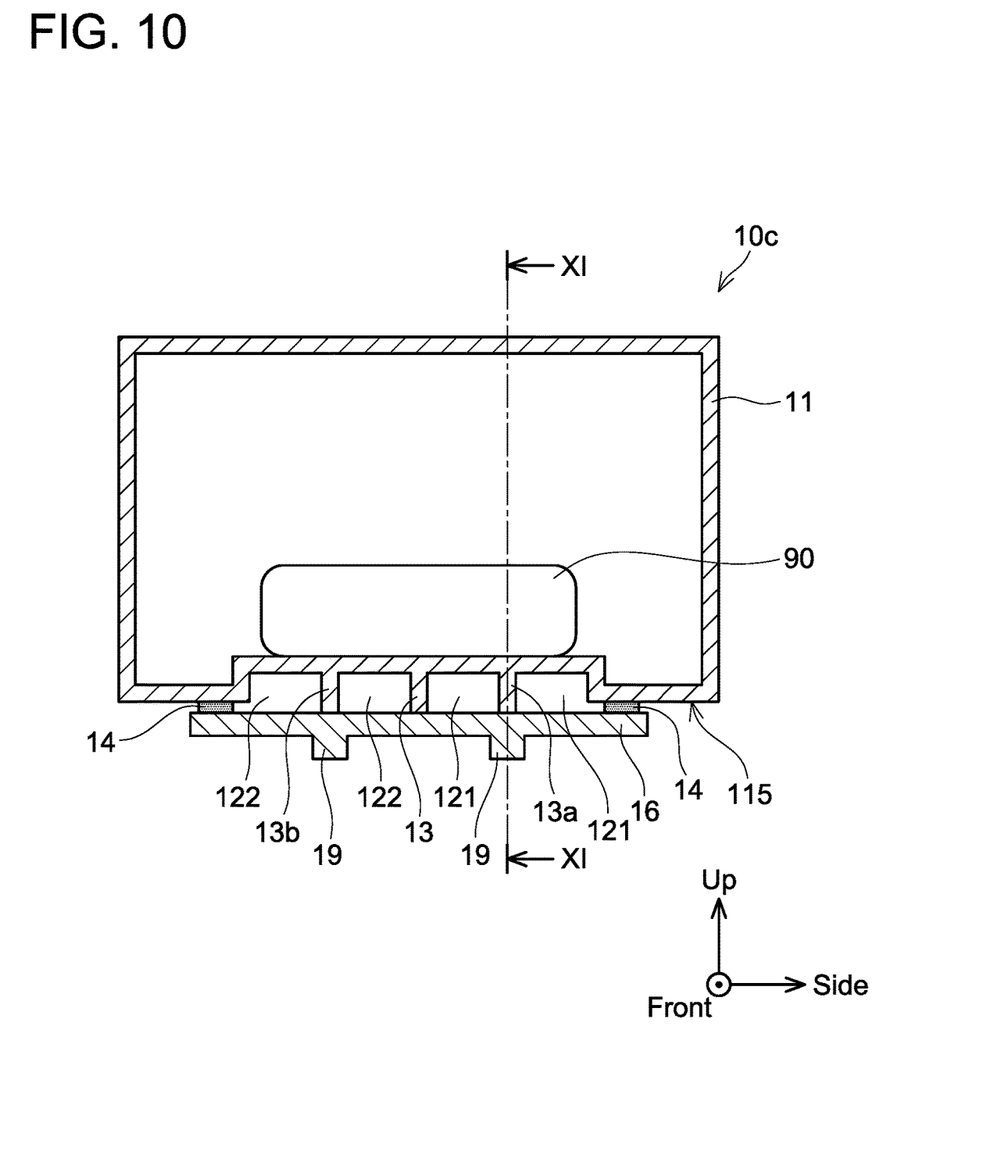
FIG. 10 is a cross-sectional view of the power control device along a line X-X of FIG. 9.
Figure 11:
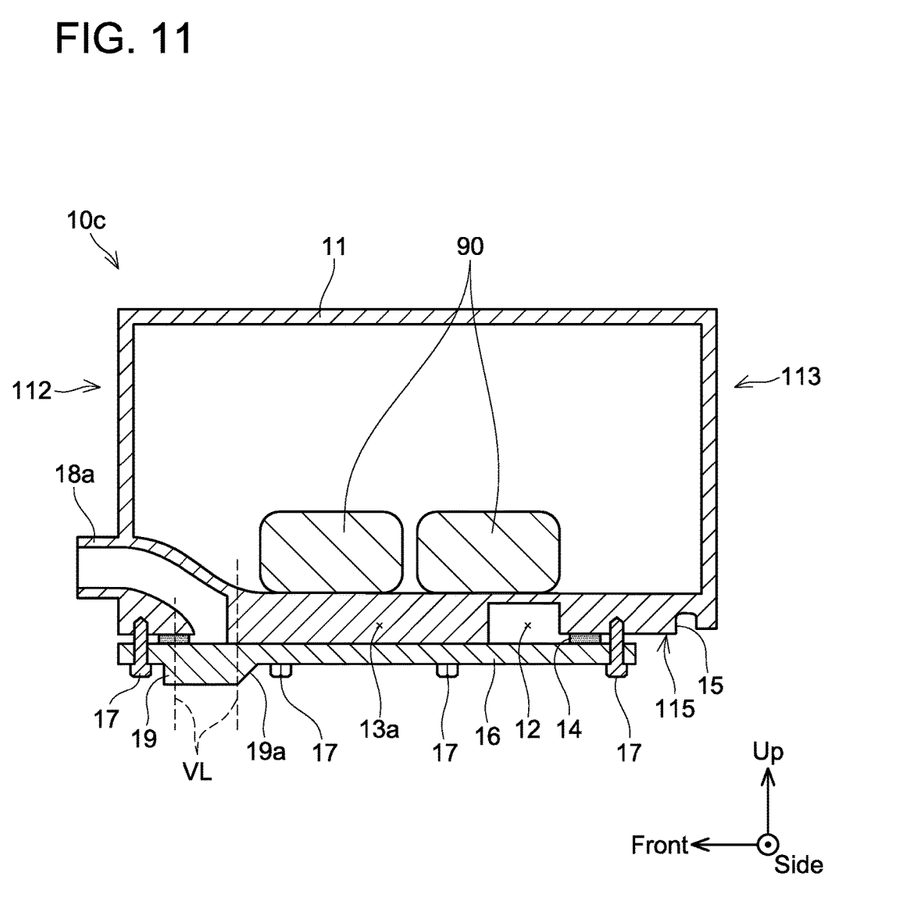
FIG. 11 is a cross-sectional view of the power control device along a line XI-XI of FIG. 10.

A power control device 10c of a third variant is shown in FIGS. 9 to 11. Similar to FIG. 5, FIG. 9 is a view of the power control device from which the cover 16 is removed. FIG. 10 is a cross section of the casing 11 cut along a plane including a Side axis and an Up axis in the drawing (plane along a line X-X of FIG. 9). FIG. 10 is a cross section passing through the ribs 19. FIG. 11 is a cross section cut along a plane including the Up axis and the Front axis in the drawing (plane along a line XI-XI of FIG. 10). FIG. 11 is a cross section passing through the ribs 19 and a fin 13a. The present variant is identical to the embodiment except for a configuration of the coolant flowing channel 12. In the present variant, the fin 13a is provided in the supply passage 121, and a fin 13b is provided in the discharge passage 122. The fins 13a and 13b are provided on a bottom surface of the coolant flow channel 12 (i.e., a surface facing the cover 16).

As shown in FIGS. 10 and 11, one of the two ribs 19 is located below the fin 13a. The fin 13a is located so as to overlap with the one of the ribs 19 viewed from a direction normal to the bottom surface 115 (direction along broken lines VLs in FIG. 11). Similarly, the other one of the two ribs 19 is located below the fin 13b. As aforementioned, the ribs 19 come into contact with the cable connection portion 49 upon collision of the vehicle. Due to this, a stress is concentrated on a portion of the cover 16 in which each of the ribs 19 is provided. If the cover 16 is distorted due to the stress, the coolant may leak from the coolant flow channel 12. However, since the rib 19 is located below the fin 13a, the cover 16 is supported by the fin 13a upon collision of the vehicle. Due to this, distortion of the cover can be prevented, and leakage of the coolant from the coolant flow passage 12 can be prevented.

Some features of the techniques described in the above embodiment and the first variant will be listed below. In the vehicle-mounted structure 2 of the embodiment and the variant, the cable connection portion 49 is located below the casing 11 of the power control device 10(10a). The cable connection portion 49 is disposed at a position facing the casing 11. Each bolt head 17a is exposed at a position facing the cable connection portion 49 provided on the lower portion of the casing 11. The rib 19(29) is provided next to the corresponding bolt head 17a on the lower portion of the casing 11 and protrudes lower than the corresponding bolt head 17a. The rib 19 (a part of the rib 29) is also provided at a position facing the cable connection portion 49. The rib 19(29) prevents the bolt head 17a from coming into contact with the cable connection portion 49 when the casing 11 moves downward due to the impact of collision.

The back lower surface (inclined surface 19a) of the rib 19 is inclined relative to the upper surface 49a of the cable connection portion 49. This inclination prevents the ribs 19 (casing 11) that move downward from damaging the cable connection portion 49. The rib 29 in the power control device 10a according to the variant is also provided with the rib reinforcing portions 29a. Each of the rib reinforcing portions 29a is disposed behind the corresponding bolt 17 at the front end of the casing 11 and extends backward from the annular rib 29. The rib reinforcing portion 29a has its lower rear surface inclined (inclined surface 29b).

The coolant flow channel 12 is provided on the lower portion of the casing 11. The bottom of the coolant flow channel 12 is opened, and the opening is closed by the cover 16(26). The cover 16(26) is fixed to the lower surface of the casing 11 with the gasket 14 interposed therebetween, while the gasket 14 is disposed so as to surround the coolant flow channel 12. The cover 16(26) is fixed to the casing 11 by the bolts 17. The rib 19(29) is provided on the cover 16(26). The rib 19(26) is located next to the bolt head 17a behind the corresponding bolt 17 on the foremost row and below the gasket 14. The rib 19(29) provided on the cover 16(26) below the gasket 14 reinforces the cover. Since the cover 16 is reinforced directly below the gasket 14, the coolant hardly leaks.

Further, some features of the techniques described in the second and third variants will be listed below. In the second variant, the rib 29 includes the rib reinforcing portion 29a and the molten metal flow ribs 29c intersecting the rib reinforcing portion 29a. Due to this, the strength of the rib reinforcing portions 29a is improved, and the purpose of the rib reinforcing portions 29a for sliding the casing 11 down forward upon collision of the vehicle can be achieved.

In the second variant, the rib 29 has a plurality of ribs 29a (rib reinforcing portions 29a) extending in parallel to each other. The molten metal flow rib 29c intersects each of the plurality of ribs 29a. This smooths the flow of the molten metal upon molding the two rib reinforcing portions 29a.

In the third variant, the coolant flowing channel 12 is provided below the casing 11. The fin 13a (13b) is provided in the coolant flowing channel 12. The bolts 17 fix the cover 16 that closes the coolant flow channel 12. The rib 19 is provided on the cover 16 and is located below the fin 13a (13b). Due to this, distortion of the cover 16 can be prevented upon collision and the coolant can be prevented from leaking from the coolant flowing channel 12.

Specific examples of the present invention have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A structure of mounting a power control device in a vehicle, the structure comprising:
 a housing that houses an electric traction motor,
 a power control device fixed above the housing with a gap between the power control device and the housing, and
 a cable connection portion provided on an upper surface of the housing at a position facing the power control device,
 wherein
 a head of a bolt is exposed on a lower portion of a casing of the power control device at a position facing the cable connection portion, and
 a rib is provided on the lower portion of the casing next to the head of the bolt, the rib protruding lower than the head of the bolt.

2. The structure as in claim 1, wherein at least part of a lower surface of the rib is inclined relative to an upper surface of the cable connection portion.

3. The structure as in claim 1, wherein
a coolant flow channel is provided on the lower portion of the casing,
the bolt fixes a cover to a lower surface of the casing, the cover facing the lower surface of the casing with a gasket interposed between the cover and the lower surface, the cover closing the coolant flow channel, the gasket being arranged so as to surround the coolant flow channel, and
the rib is provided on the cover and is located below the gasket.

4. The structure as in claim 1, wherein
a coolant flow channel is provided on the lower portion of the casing,
a fin is provided in the coolant flow channel,
the bolt fixes a cover closing the coolant flow channel and the rib is provided on the cover and is located below the fin.

5. The structure as in claim 4, wherein
the bolt fixes the cover facing a lower surface of the casing with a gasket interposed between the cover and the lower surface, and
the rib is located below the fin and the gasket.

6. The structure as in claim 1, wherein
the rib is provided at a position facing the cable connection portion.

7. The structure as in claim 1, wherein
the rib includes a first rib and a second rib intersecting the first rib.

8. The structure as in claim 7, wherein
the rib includes a plurality of first ribs extending in parallel to each other, and
the second rib intersects each of the plurality of first ribs.

* * * * *